US009288061B2

(12) United States Patent
Lu et al.

(10) Patent No.: US 9,288,061 B2
(45) Date of Patent: Mar. 15, 2016

(54) SAFE COMMUNICATION METHOD WITH CARD (71) Applicant: Feitian Technologies Co., Ltd., Beijing (CN)

(72) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 0 days.

(21) Appl. No.: 14/380,980

(22) PCT Filed: Jul. 30, 2013

(86) PCT No.: PCT/CN2013/080402
§ 371 (c)(1),
(2) Date: Aug. 26, 2014

(87) PCT Pub. No.: WO2014/032493
PCT Pub. Date: Mar. 6, 2014

(65) Prior Publication Data
US 2015/0163063 A1    Jun. 11, 2015

(30) Foreign Application Priority Data

Aug. 27, 2012  (CN) .......................... 2012 1 0309493

(51) Int. Cl.
H04L 29/06 (2006.01)
H04L 9/32 (2006.01)
H04L 9/08 (2006.01)

(52) U.S. Cl.
CPC ............ *H04L 9/3247* (2013.01); *H04L 9/0869* (2013.01); *H04L 63/0428* (2013.01); *H04L 63/0853* (2013.01); *H04L 63/105* (2013.01)

(58) Field of Classification Search
CPC . H04L 9/3247; H04L 9/0869; H04L 63/0428; H04L 63/105
See application file for complete search history.

(56) References Cited

U.S. PATENT DOCUMENTS

| | | | |
|---|---|---|---|
| 6,990,588 B1* | 1/2006 | Yasukura | G06F 21/316 713/155 |
| 2008/0067240 A1* | 3/2008 | Nakano | G06Q 20/06 235/380 |
| 2008/0289018 A1* | 11/2008 | Kawaguchi | G06F 21/62 726/9 |
| 2009/0043681 A1* | 2/2009 | Shoji | G06F 21/335 705/35 |
| 2009/0260058 A1 | 10/2009 | Huang | |
| 2010/0049977 A1* | 2/2010 | Kanemoto | G06F 21/445 713/169 |
| 2012/0278614 A1* | 11/2012 | Choi | G06F 21/32 713/159 |

* cited by examiner

Primary Examiner — Techane Gergiso
(74) Attorney, Agent, or Firm — Hammer & Associates, P.C.

(57) ABSTRACT

Disclosed is a safe communication method with a card, comprising: conducting mutual authentication between a card and an entity other than the card; and after the authentication has passed, the entity other than the card sending a communication command of a corresponding security level, and the card executing a corresponding operation according to the corresponding security level, and then sending a communication success response to the entity other than the card. The method solves the problem that communication data may be monitored or intercepted.

28 Claims, 2 Drawing Sheets

SAFE COMMUNICATION METHOD WITH CARD

TECHNOLOGY FIELD

The present invention relates to information security field and in particularly, to a safe communication method of a card.

PRIOR ART

With rapid development of computer technology and interne technology, information networking has penetrated through all aspects of people's life and changed people's life style gradually, and in the meantime, computer and networking crime is continuously emerging. People reach a common point on protection of data inside of the information networking with methods such as identity identifying and encrypted, and widely use smart card production as a tool of identifying user's identity. Safe and efficient usage of a smart card to encrypt and decrypt data transferred online ensures a user to enjoy services provided by the information networking in a safe, rapid and convenient environment.

For security requirement on information safe communication field, the prior art is not perfect and is inevitable to the problem that the communication data is listened or interrupted.

SUMMARY OF THE INVENTION

For solving shortcoming in the prior art, the invention provides a safe communication method of a card.

Thus, the present invention provides a safe communication method of a card, characterized in that, said method comprises:

Step S1, generating a first data block, signing the first data block to obtain a first signature result, and sending an authentication command to an outside-card entity by the card;

Step S2, receiving the authentication command and obtaining the first signature result from the authentication command by the outside-card entity, generating a second data block and signing the second data block to obtain a second signature result by the outside-card entity, and comparing the first signature result with the second signature result, if they are identical, going to Step S3; while if they are not identical, returning to Step S1;

Step S3, generating a third data block and signing the third data block to obtain a third signature result by the outside-card entity, taking the obtained third signature result as a part of the authentication data, storing a current safety level, signing the authentication data to obtain an outside-card entity signature and sending an external authentication command to the card;

Step S4, receiving the external authentication command, obtaining the authentication data and the outside-card entity signature from the external authentication command, and obtaining the third signature result from the authentication data by the card; generating a fourth data block and signing the fourth data block to obtain a fourth signature result by the card, and comparing the third signature result with the fourth signature result, if they are not identical, returning to Step S1; while if they are identical, going to Step S5;

Step S5, signing the obtained authentication data to obtain a card signature by the card, comparing the outside-card entity signature with the card signature, if they are not identical, returning to Step S1; while if they are identical, going to Step S6;

Step S6, storing the current safety level and sending an authentication success response to the outside-card entity by the card;

Step S7, reading the current safety level and performing operation according to the safety level, and sending a communication command according to the safety level to the card by the outside-card entity;

Step S8, performing operation according to the received communication command and sending a communication success response to the outside-card entity by the card; and Step S9, receiving the communication success response and determining whether the communication is continued by the outside-card entity, if yes, going to Step S7; otherwise, ending.

Preferably, before Step S1, the method comprises:

generating a first random number and storing the first random number by the outside-card entity;

sending an internal initialization command including the first random number to the card by the outside-card entity;

receiving the internal initialization command and reading the first random number from the internal initialization command by the card;

generating a second random number and storing the second random number by the card; and generating a first session key, a second session key and a third session key, and storing the first session key, the second session key and the third session key by the card.

Preferably, the first random number generated by the outside-card entity comprises 8 bytes, while the second random number generated by the card comprises 6 bytes;

generating the first session key by the card comprises generating a first derivative data with a serial counting value, a first constant and a first fixed data by the card, and encrypting the first derivative data with a built-in first key and with a first preset method to obtain the first session key;

generating the second session key by the card comprises generating a second derivative data with the serial counting value, a second constant and the first fixed data by the card, and encrypting the second derivative data with a built-in second key and with the first preset method to obtain the second session key; and generating the third session key by the card comprises generating a third derivative data with the serial counting value, a third constant and the first fixed data by the card, and encrypting the third derivative data with a built-in third key and with the first preset method to obtain the third session key.

Preferably, Step S1 comprises concatenating, by the card, the first random number, the serial counting value and the second random number to obtain the first data block, signing the first data block with the first session key and a first variable to obtain the first signature result, and sending to the outside-card entity including the first signature result, the second random number and the authentication command of the serial counting value.

Preferably, between Step S1 and Step S2, the method further comprises obtaining, by the outside-card entity, the second random number and the serial counting value from the authentication command;

generating, by the outside-card entity, a fourth session key comprises generating the fourth derivative data with the serial counting value, the first constant and the first fixed data and encrypting the fourth derivative data with the built-in first key and with the first preset method to obtain the fourth session key by the outside-card entity;

generating, by the outside-card entity, a fifth session key comprises generating the fifth derivative data with the serial counting value, the second constant and the first fixed data and encrypting the fifth derivative data with the built-in second key and with the first preset method to obtain the fifth session key by the outside-card entity; and generating, by the outside-card entity, a sixth session key comprises generating the sixth derivative data with the serial counting value, a third constant and the first fixed data and encrypting the sixth derivative data with a built-in third key and with the first preset method to obtain the sixth session key by the outside-card entity.

Preferably, in Step S2, the generating the second data block and signing the second data block to obtain the second signature result by the outside-card entity comprises concatenating, by the outside-card entity, the first random number, the serial counting value and the second random number to obtain the second data block, and signing the second data block with the fourth session key and a second variable to obtain the second signature result; and in Step S3, generating a third data block and signing the third data block, by the outside-card entity comprises concatenating, by the outside-card entity, the serial counting value, the second random number and the first random number to obtain the third data block, and signing the third data block with the fourth session key and a third variable to obtain the third signature result.

Preferably, generating a fourth data block and signing the fourth data block by the card comprises concatenating, by the card, the serial counting value, the second random number and the first random number to obtain the fourth data block, and signing the fourth data block with the first session key and a fourth variable to obtain the fourth signature result.

Preferably, the signature method comprises

Step A, dividing the data block to be signed into blocks in term of a preset byte number, and for a data block less than the preset byte number, appending the data block to the preset byte number;

Step B, determining whether a counting value of a cycle counter is identical to the number of blocks, if yes, going to Step D; otherwise, going to Step C;

Step C, encrypting the command data being divided into the number of blocks equaling to the current counting value with a specified byte of the session key and a variable with a second preset method, replacing the variable with the obtained encryption result, and adding 1 to the current counting value and then going to Step B; and Step D, encrypting command data of a last block with the session key and the variable with the second preset method and storing the obtained encryption result as a signature result.

Preferably, the signature method comprises

Step A, dividing the data block to be signed into blocks in term of a preset byte number, and for a data block less than the preset byte number, appending the data block to the preset byte number;

Step B, determining whether a counting value of a cycle counter is identical to the number of blocks, if yes, going to Step D; otherwise, going to Step C;

Step C, encrypting the command data being divided into the number of blocks equaling to the current counting value with a specified byte of the session key and a variable with a second preset method, replacing the variable with the obtained encryption result, and adding 1 to the current counting value and then going to Step B; and Step D, encrypting command data of a last block with the session key and the variable with the second preset method and storing the obtained encryption result as a signature result.

Preferably, the signature method comprises

Step A, dividing the data block to be signed into blocks in term of a preset byte number, and for a data block less than the preset byte number, appending the data block to the preset byte number;

Step B, determining whether a counting value of a cycle counter is identical to the number of blocks, if yes, going to Step D; otherwise, going to Step C;

Step C, encrypting the command data being divided into the number of blocks equaling to the current counting value with a specified byte of the session key and a variable with a second preset method, replacing the variable with the obtained encryption result, and adding 1 to the current counting value and then going to Step B; and Step D, encrypting the command data of the last block with the session key and the variable with the second preset method, and storing the obtained encryption result as a signature result.

Preferably, before storing, by the outside-card entity, the current safety level, Step S3 further comprises: modifying, by the outside-card entity, a preset part of the authentication data; and before storing, by the card, the current safety level, Step S6 further comprises: modifying, by the card, a preset part of the authentication data, adding 1 to the serial counting value, and storing a card signature as a card signature information value; and storing, by the outside-card entity and the card, the current safety level comprises storing the third byte of the authentication data as the current safety level.

Preferably, modifying, by the outside-card entity, a preset part of the authentication data comprises modifying the first byte of the authentication data as the first fixed value, and adding 8 to the length value of the data field; and modifying, by the card, a preset part of the authentication data comprises modifying the first byte of the authentication data as the second fixed value, and deducting 8 from the length value of the data field.

Preferably, signing, by the outside-card entity, the authentication data comprises signing, by the outside-card entity, a specified part of the authentication data with a fifth session key and an outside-card signature information value to obtain an outside-card entity signature; and signing, by the card, the authentication data comprises signing, by the card, a specified part of the authentication data with the second session key and the card signature information value to obtain a card signature.

Preferably, signing, by the outside-card entity, the authentication data comprises signing, by the outside-card entity, a specified part of the authentication data with a fifth session key and an outside-card signature information value to obtain an outside-card entity signature; and signing, by the card, the authentication data comprises signing, by the card, a specified part of the authentication data with the second session key and the card signature information value to obtain a card signature.

Preferably, the specified part of the authentication data comprises a remainder of the authentication data other than an optional response command data field length;

signing, by the outside-card entity, a specified part of the authentication data comprises:

Step A, dividing the remainder of the authentication data other than the optional response command data field length into blocks in term of 8 bytes, and for the block less than 8 bytes, it being filled automatically to 8 bytes so as to obtain N blocks;

Step B, determining whether a counting value M of the cycle counter is identical to a block number N; if yes, going to Step D; otherwise, going to Step C;

Step C, encrypting the command data of the Mth block with the first 8 bytes of the fifth session key and the outside-card signature information value, replacing an original outside-card signature information value with the obtained encryption result and storing the obtained encryption result, adding 1 to the counting value M and then going to Step B;

Step D, encrypting the command data of the last block with the fifth session key and the outside-card entity signature information value to obtain an encryption result of 8 bytes, and storing the encryption result as an outside-card entity signature; and signing, by the card, a specified part of the authentication data comprises that Step a, dividing a remainder of the authentication data other than an optional response command data field length into blocks in term of 8 bytes, and for the block less than 8 bytes, it being filled automatically to 8 bytes and Q blocks being obtained;

Step b, determining whether counting value P of the cycle counter is identical to the block number Q; if yes, going to Step d; otherwise, going to Step c;

Step c, encrypting the command data of the Pth block with the first 8 bytes of the second session key and the card signature information value, replacing an original card signature information value with the obtained encryption result, storing the obtained encryption result, adding 1 to the counting value P and then going to Step b; and Step d, encrypting the command data of the last block with the second session key and the card signature information value to obtain an encryption result of 8 bytes, and storing the encryption result as a card signature.

Preferably, before Step C, the method further comprises determining an outside-card entity signature information value, when the outside-card entity signature is computed for the first time, an initial value of the outside-card entity signature value is a second fixed data with 8 bytes, while when the outside-card entity signature is not computed for the first time, the outside-card entity signature value is obtained by computing the outside-card entity signature being authenticated correct last time with the first 8 bytes of the fifth session key and with the third preset method; and before Step c, the method further comprises determining the card signature information value, when the card signature is computed for the first time, the initial value of the card signature value is a second fixed data with 8 bytes, while when the card signature is not computed for the first time, the card signature value is obtained by computing the card signature being authenticated correct last time with first 8 bytes of the second session key and with the third preset method.

Preferably, Step 7 comprises reading, by the outside-card entity, the current safety level, and if the current safety level is 0, sending, by the outside-card entity, the first communication command to the card.

Step 7 comprises reading, by the outside-card entity, the current safety level, and if the current safety level is 1, modifying, by the outside-card entity, a preset part of the communication command, signing a specified part of the communication command with the fifth session key and the outside-card entity signature information value, replacing an original outside-card signature information value with the obtained outside-card entity signature, storing the obtained outside-card entity signature, and sending a second communication command including the communication command and the outside-card entity signature to the card.

Preferably, Step S7 comprises that reading, by the outside-card entity, the current safety level, and if the current safety level is 3, determining, by the outside-card entity, whether sensitive data of the communication command needs to be encrypted;

if yes, encrypting, by the outside-card entity, the sensitive data of the communication data with the sixth session key, modifying a preset part of the communication command by the outside-card entity, signing a specified part of the communication command with the fifth session key and the outside-card entity signature information value, replacing an original outside-card entity signature information value with the outside-card entity signature and storing the outside-card entity signature; filling the communication command, modifying a fixed part of the communication command, encrypting a data field of the communication command with the fourth session key, and replacing pre-encryption part with the obtained encryption result by the outside-card entity; sending, by the outside-card entity, a third communication command including the communication command and the outside-card entity signature to the card;

if not, modifying a preset part of the communication command, signing a specified part of the communication command with the fifth session key and the outside-card entity signature information value, replacing an original outside-card entity signature information value with the obtained outside-card entity signature by the outside-card entity; filling the communication command, modifying a fixed part of the communication command, encrypting data field of the communication command with the fourth session key, and replacing the pre-encryption part with the obtained encryption result by the outside-card entity; sending, by the outside-card entity, a fourth communication command including the communication command and the outside-card entity signature to the card.

Preferably, encrypting, by the outside-card entity, sensitive data of the communication command with the sixth session key comprises encrypting, by the sixth session key, the sensitive data of the communication command with the first preset method, and before the encryption, the method comprises filling the length of the sensitive data to times of 8 bytes with a filling method agreed by the outside-card entity and the card; and filling the communication command and modifying a fixed part of the communication command by the outside-card entity comprises:

Step E, determining whether the length value of the data field of the communication command is times of 8 bytes; if yes, going to Step F; otherwise, going to Step G;

Step F, the length of the filled data being 0 and going to Step H;

Step G, filling the data field to times of 8 bytes with a specified method;

Step H, taking the length value of the data field of the communication command plus the filled data length as a new length value of the data field; and encrypting the data field of the communication command with the fourth session key comprises encrypting the data field of the communication command with the fourth session key with the first preset method.

Preferably, modifying, by the outside-card entity, a preset part of the communication command comprises modifying a first byte of the communication command as a first fixed value, and adding 8 to the length value of the data field; and signing a specified part of the communication command with the fifth session key and the outside-card entity signature information value comprises:

Step A', dividing remainder of the communication command other than an optional response command data field length into blocks in terms of 8 bytes, and for a block less than 8 bytes, it being filled to 8 bytes automatically and N' blocks being obtained;

Step B', determining whether a counting value M' of the cycle counter is identical to a block number N'; if yes, going to Step D'; while if not, going to Step C';

Step C', encrypting the command data of M'th block with the first 8 bytes of the fifth session key and the outside-card entity signature information value, replacing the original outside-card entity information value with the obtained encryption result, storing the obtained encryption result, adding 1 to the counting value M' and then going to Step B'; and Step D': encrypting the command data of the last block with the fifth session key and the outside-card entity signature information value, and storing the obtained encryption result as an outside-card entity signature.

Preferably, modifying, by the outside-card entity, a preset part of the communication command comprises modifying the first byte of the communication command as a first fixed value, and adding 8 to length value of the data field; and signing a specified part of the communication command with the fifth session key and the outside-card entity signature information value comprises:

Step A', dividing remainder of the communication command other than an optional response command data field length into blocks in terms of 8 bytes, and for a block less than 8 bytes, it being filled to 8 bytes automatically and N' blocks being obtained;

Step B', determining whether a counting value M' of the cycle counter is identical to a block number N'; if yes, going to Step D'; while if not, going to Step C';

Step C', encrypting the command data of M'th block with the first 8 bytes of the fifth session key and the outside-card entity signature information value, replacing the original outside-card entity information value with the obtained encryption result, storing the obtained encryption result, adding 1 to the counting value M' and then going to Step B'; and Step D': encrypting the command data of the last block with the fifth session key and the outside-card entity signature information value, and storing the obtained encryption result as an outside-card entity signature.

Preferably, Step S8 comprises:

if the current safety level is 0, receiving, by the card, the first communication command, and forwarding it to an application inside of the card, and sending a communication success response to the outside-card entity.

Step S8 comprises:

if the current safety level is 1, receiving, by the card, the second communication command and reading the communication command and the outside-card entity signature from the second communication command;

signing, by the card, a specified part of the communication command with the second session key and the card signature information value to obtain the card signature;

comparing, by the card, the outside-card entity signature with the card signature, if they are identical, replacing, by the card, an original card signature information value with the card signature and storing the card signature, modifying a preset part of the communication command, and sending a communication success response to the outside-card entity;

if they are not identical, sending, by the card, a communication failure response to the outside-card entity.

Preferably, Step S8 comprises:

if the current safety level is 3, receiving, by the card, the third communication command, and reading the communication command and the outside-card entity signature from the third communication command;

decrypting, by the card, data field of the communication command with the first session key, replacing a pre-encryption part with the obtained encryption result, and modifying a fixed part of the communication command;

signing, by the card, a specified part of the communication command with the second session key and the card signature information value to obtain the card signature;

comparing, by the card, the outside-card entity signature with the card signature, if they are identical, replacing, by the card, an original card signature information value with the card signature, storing the obtained card signature, and modifying a preset part of the communication command; if cipher text is included in the communication command, decrypting, by the card, the cipher text in the communication command with the third session key, replacing a pre-decryption part with the decrypted result, and sending a communication success response to the outside-card entity; if cipher text is not included in the communication command, sending the communication success response to the outside-card entity;

if they are not identical, sending, by the card, a communication failure response to the outside-card entity.

Preferably, decrypting, by the card, the data field of the communication command with the first session key comprises decrypting data field of the communication command with the first session key and with a first preset method;

the modifying the fixed part of the communication command comprises taking the length value of the communication command minus the filled data length as a new length value of the data field; and decrypting, by the third session key, the cipher text of the communication command comprises decrypting the cipher text of the communication command with the third session key and with first preset method.

Preferably, signing, by the card, a specified part of the communication command with the second session key and the card signature information value comprises:

Step a': dividing a remainder of the authentication data other than an optional response command data field length into blocks in term of 8 bytes, and then for a block less than 8 bytes, it being filled automatically to 8 bytes and q' blocks being obtained;

Step b', determining whether counting value p' of the cycle counter is identical to block number q'; if they are identical, going to Step d'; otherwise, going to Step c';

Step c', encrypting the command data of the pth block with the first 8 bytes of the second session key and the card signature information value, replacing the original card signature information value with the obtained encryption result, and storing the obtained encryption result, adding 1 to the counting value p' and then going to Step b';

Step d', encrypting the command data of the last block with the second session key and the card signature information value, and storing the obtained encryption result as the card signature; and modifying the preset part of the communication command comprises modifying the first byte of the communication command as a second fixed value, and deducting 8 from the length value of the data field.

Preferably, signing, by the card, a specified part of the communication command with the second session key and the card signature information value comprises:

Step a': dividing a remainder of the authentication data other than an optional response command data field length into blocks in term of 8 bytes, and then for a block less than 8 bytes, it being filled automatically to 8 bytes and q' blocks being obtained;

Step b', determining whether counting value p' of the cycle counter is identical to block number q'; if they are identical, going to Step d'; otherwise, going to Step c';

Step c', encrypting the command data of the pth block with the first 8 bytes of the second session key and the card signature information value, replacing the original card signature information value with the obtained encryption result, and storing the obtained encryption result, adding 1 to the counting value p' and going to Step b';

Step d', encrypting the command data of the last block with the second session key and the card signature information value, and storing the obtained encryption result as the card signature; and modifying the preset part of the communication command comprises modifying the first byte of the communication command as a second fixed value, and deducting 8 from length value of the data field.

Solutions provided by embodiments of the invention have advantages that communication between an outside-card entity and a card with the method disclosed by the invention provides a guaranteed safe communication mechanism for one or both of the outside-card entity and the card, and session initiating and mutual authenticating between both parts of the communication ensures validity of relating one part and integrity of the communication data, also sets security limit to the subsequent communication, and therefore improves security of the communication.

BRIEF DESCRIPTION OF THE DRAWINGS

FIG. 1-1 is a flow chart of a safe communication method of a card provided by Embodiment 1; and FIG. 1-2 is a flow chart of a safe communication method of a card provided by Embodiment 1.

DETAILED DESCRIPTION OF THE INVENTION

For clarifying purposes, solutions and advantages of the invention, a further description will be given to the embodiments of the invention in accompanying with the drawings.

In the embodiments of the invention, an outside-card entity can be a host or a card.

Embodiment 1

Figure 11:
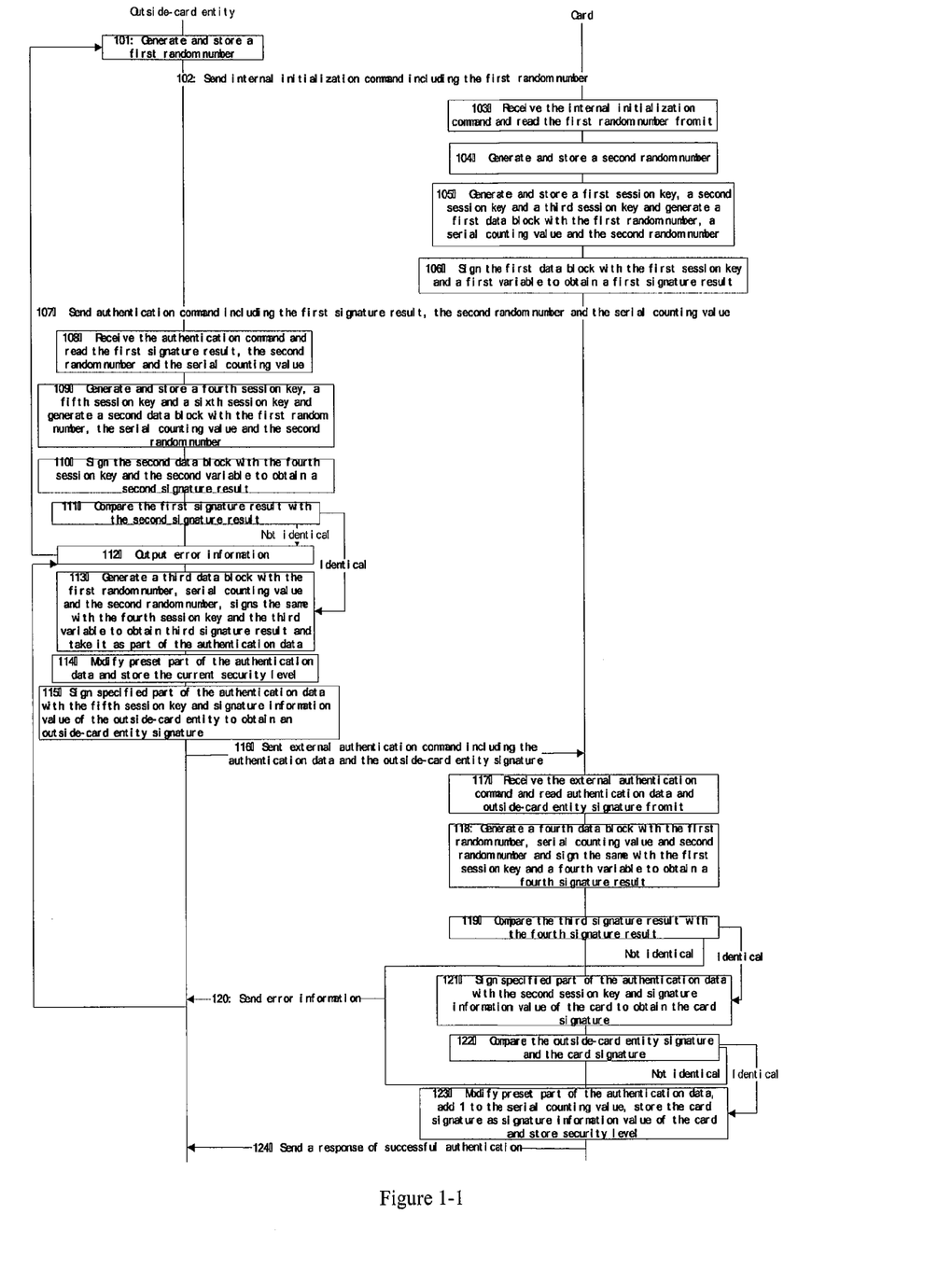

As illustrated in FIG. 1-1, Embodiment 1 provides a safe communication method of a card, including steps as below.

Step 101, an outside-card entity generates and stores a first random number. In the embodiment 1, the outside-card entity generates the first random number with 8 bytes, and stores the same. For example, the first random number is 1122334455667788.

Step 102, the outside-card entity sends an internal initialization instruction including the first random number to the card.

In the embodiment 1, the first two bytes sent to the card are 8050 and the internal initialization instruction including the first random number.

For example, the internal initialization instruction is 80500000081122334455667788 1C.

Step 103, the card receives the internal initialization instruction and reads the first random number from it.

Step 104, the card generates and stores a second random number.

In the embodiment 1, the card generates and stores the second random number with 6 bytes.

For example, the second random number is 6361FEB56EB9.

Step 105, the card generates and stores a first session key, a second session key and a third session key, and generates a first data block according to the first random number, the serial counting value and the second random number.

In the embodiment 1, the card generates three session keys separately with a serial counting value of two bytes, three two-byte constants agreed by three outside-card entities with the card, and three internal keys. The three internal keys refer to a 16-byte first key, a 16-byte second key and a 16-byte third key.

For example, the serial counting value is 0001.
The first constant is 0182.
The second constant is 0101.
The third constant is 0181.
The first key is 404142434445464748494a4b4c4d4e4f.
The second key is 404142434445464748494a4b4c4d4e4f.
The third key is 404142434445464748494a4b4c4d4e4f.

The step includes that the card generates the first derived data with the serial counting value of two bytes, the first constant of two bytes agreed by the outside-card entity with the card and 00 of 12 bytes, encrypts the first derived data with the first key by DES-CBC or by other algorithms so as to generate the first session key.

For example, the first derived data is 01820001000000000000000000000000 and the first session key is 25C9794A1205FF244F5FA0378D2F8D59.

The card generates the second derived data with the serial counting value of two bytes, the second constant of two bytes agreed by the outside-card entity with the card, 00 of 12 bytes, and encrypts the second derived data with the second key by DES-CBC or by other algorithms so as to generate the second session key.

For example, the second derived data is 01010001000000000000000000000000 and the second session key is 9BED98891580C3B245FE9EC58BFA8D2A.

The card generates the third derived data with the serial counting value of two bytes, the third constant of two bytes agreed by the outside-card entity with the card, 00 of 12 bytes, and encrypts the third derived data with the third key by DES-CBC or by other algorithms so as to generate the third session key.

For example, the third derived data is 01810001000000000000000000000000 and the third session key is 0E51FDF196141F227A57BD154012FD39.

In the embodiment 1, the first data block is generated in a form of the random number+the serial counting value+the second random number.

For example, the first data block is 11223344556677880001 6361FEB56EB9.

Step 106, the card signs the first data block with the first session key and the first variable so as to obtain the first signature result.

In the embodiment 1, the first data block is signed with the first session key and the first variable by ALG_DES_MAC8_ISO9797_1_M2_ALG3 or by DES or other algorithms. The signature includes below steps.

Step 106-1, the first data block is divided into blocks in term of integer times of 8 bytes. For example, the first data block is divided into blocks in term of 8 bytes, and then a block less than 8 bytes is filled to 8 bytes and Y blocks are obtained.

Step 106-2, determine whether counting value X of a cycle counter is identical to the block number Y, if yes, go to Step 106-4; otherwise, go to Step 106-3.

Step 106-3, encrypt the Xth block of the command data with the first 8 bytes of the first session key and the first variable, and replace the first variable with the obtained encryption result of 8 bytes, add 1 to X, and then go to Step 106-2.

Step 106-4, encrypt the command data of the Xth block, i.e. the last block, with the first session key and the first variable so as to obtain an encryption result of 8 bytes, and store the encryption result of 8 bytes as the first signature result.

In the embodiment 1, the initial value of X is 1 and the initial value of the first variable is 00 of 8 bytes.

For example, the first signature result is 4E4F8430123F25C6.

Step 107, the card sends an authentication command including the first signature result, the second random number and the serial counting value to the outside-card entity.

00003187F0E89F657D9BFF0200016361FEB56EB94-E4F8430123F25C69000, for example, can be the authentication command.

Step 108, the outside-card entity receives the authentication command and reads the first signature result, the second random number and the serial counting value from the authentication command.

Step 109, the outside-card entity generates and stores the fourth session key, the fifth session key and the sixth session key, and generates the second data block with the first random number, the serial counting value and the second random number.

In the embodiment 1, the outside-card entity generates three session keys with the serial counting value of two bytes, three two-byte constants agreed separately by three outside-card entities with the card and three internal keys. The three internal keys are the first key of 16 bytes, the second key of 16 bytes and the third key of 16 bytes.

The step includes that the outside-card entity generates the fourth derived data with the serial counting value of two bytes, the first constant of two bytes agreed by the outside-card entity with the card and 00 of 12 bytes, encrypts the fourth derived data with the first key by DES-CBC or other algorithm so as to generate a fourth session key.

For example, the fourth derived data is 0182000100000000000000000000000 and the fourth session key is 25C9794A1205FF244F5FA0378D2F8D59.

The outside-card entity generates the fifth derived data with the serial counting value of two bytes, the second constant of two bytes agreed by the outside-card entity with the card and 00 of 12 bytes, and encrypts the fifth derived data with the second key by DES-CBC or by other algorithm so as to generate fifth session key.

For example, the fifth derived data is 0101000100000000000000000000000 and the fifth session key is 9BED98891580C3B245FE9EC58BFA8D2A.

The outside-card entity generates the sixth derived data with the serial counting value of two bytes, the third constant of two bytes agreed by the outside-card entity with the card and 00 of 12 bytes and encrypts the sixth derived data with the third key by DES-CBC or other algorithm so as to generate the sixth session key.

For example, the sixth derived data is 0181000100000000000000000000000 and the sixth session key is 0E51FDF196141F227A57BD154012FD39.

In the embodiment 1, the second data block is generated in a form of the first random number+the serial counting value+the second random number.

For example, the second data block is 11223344556677880016361FEB56EB9.

Step 110, the outside-card entity signs the second data block with the fourth session key and the second variable so as to obtain the second signature result.

In the embodiment 1, the second data block can be signed with the fourth session key and the second variable by ALG_DES_MAC8_ISO9797_1_M2_ALG3 algorithm or by DES or other algorithm. The signing operation includes steps as below.

Step 110-1, the second data block is divided into blocks in term of integer times of 8 bytes. For example, the second data block is divided into blocks in term of 8 bytes, and a block less than 8 bytes is filled to 8 bytes with algorithm and Y' blocks are obtained.

Step 110-2, determine whether counting value X' of the cycle counter is identical to the block number Y'; if yes, go to Step 110-4; otherwise, go to Step 110-3.

Step 110-3, encrypt the command data of the X'th block with the first 8 bytes of the fourth session key and the second variable, and replace the second variable with the obtained encryption result of 8 bytes, add 1 to X' and then go to Step 110-2.

Step 110-4, encrypt the command data of the X'th block, i.e. the last block, with the fourth session key and the second variable so as to obtain an encryption result of 8 bytes, and store the encryption result as a second signature result.

In the embodiment 1, the initial value of X' is 1. Initial value of the second variable is 00 of 8 bytes.

For example, the second signature result is 4E4F8430123F25C6.

Step 111, the outside-card entity compares the first signature result with the second signature result.

If the first signature result is identical to the second signature result, go to Step 113; otherwise, go to Step 112.

Step 112, output an error information and go to Step 101.

Step 113, the outside-card entity generates the third data block with the first random number, the serial counting value and the second random number, signs the third data block with the fourth session key and the third variable so as to obtain a third signature result, and takes the third signature result as a part of the authentication data.

In the embodiment 1, the third data block is generated in a format of the serial counting value+the second random number+the first random number.

For example, the third data block is 00016361FEB56EB91122334455667788.

The third data block is signed with the fourth session key and the third variable by ALG_DES_MAC8_ISO9797_1_M2_ALG3 or by DES or other algorithm with same method as that in Step 110.

For example, the third signature result is C1A2343B9685555D.

The authentication data includes a data header, a safety level, a length value of a data field, a data field and a length of the data field of an optional response command. The length of the data field of the optional response command is optional.

The third signature result is included in the data field.

Step 114, the outside-card entity modifies preset part of the authentication data and stores the current safety level.

In the embodiment 1, the step includes modifying the first byte of the authentication data as 84, adding 8 to the length value of the data field and storing the third byte of the authentication data as the current safety level.

For example, the modified authentication data is 8482000010C1A2343B9685555D and the current safety level stored is 0.

Step 115, the outside-card entity signs preset part of the authentication data with the fifth session key and the outside-card entity signature information so as to obtain an outside-card entity signature.

In the embodiment 1, the outside-card entity signs a remainder of the authentication data other than the optional response command data field length with the fifth session key and the outside-card entity signature information value. The signing operation includes steps as below.

Step 115-1, divide the remainder of the authentication data other than the optional response command data field length into blocks in term of integer times of 8 bytes, for example, in term of 8 bytes, a block less than 8 bytes is filled to 8 bytes with algorithm and N blocks are obtained.

Step 115-2, determine whether a counting value M of the cycle counter is identical to the block number N, if yes, go to Step 115-4; otherwise, go to Step 115-3.

Step 115-3, encrypt command data of the Mth block with the first 8 bytes of the fifth session key and the signature information of the outside-card entity, and replace the original signature information of the outside-card entity with the obtained encryption result of 8 bytes, store the same, add 1 to M and then go to Step 115-2.

Step 115-4, encrypt the command data of the Mth block, i.e. the last block, with the fifth session key and the information value of the outside-card entity so as to obtain an encryption result of 8 bytes and store the same as an outside-card entity signature.

In the embodiment 1, the initial value of M is 1 and the initial value of information value of the outside-card entity signature is 00 of 8 bytes.

Step 116, the outside-card entity sends an external authentication command including authentication data and the outside-card entity signature to the card;

For example, 8482000010C1A2343B9685555D98A85500B41F0811, in which the authentication data is 8482000010C1A2343B9685555D and the signature of the outside-card entity is 98A85500B41F0811, can be the external authentication command.

Step 117, the card receives the external authentication command and reads the authentication data and the outside-card entity signature from the external authentication command.

Step 118, the card generates the fourth data block with the first random number, the serial counting value and the second random number, and signs the fourth data block with the first session key and the fourth variable so as to obtain the fourth signature result.

In the embodiment 1, the fourth data block is generated in a form of the serial counting value+the second random number+the first random number.

For example, the fourth data block is 00016361FEB56EB91122334455667788. The fourth data block is signed with the first session key and the fourth variable by ALG_DES_MAC8_ISO9797_1_M2_ALG3 or by DES or other algorithm with the same method as that used in Step 106.

For example, the fourth signature result is C1A2343B9685555D.

Step 119, the card compares the third signature result with the fourth signature result, if they are identical, goes to Step 121; otherwise, goes to Step 120.

Step 120, the card sends error information to the outside-card entity and goes to Step 112.

Step 121, the card signs a specified part of the authentication data with the second session key and signature information value of the second card so as to obtain a card signature.

In the embodiment 1, the card signature is obtained by signing the remainder of the authentication data other than the optional response command data field length with the second session key.

The signing operation is detailed as below.

Step 121-1, divide the remainder of the authentication data other than the optional response command data field length into blocks in term of times of 8 bytes, for example, in term of 8 bytes, a block less than 8 bytes is filled automatically to 8 bytes and Q blocks are obtained.

Step 121-2, determine whether the counting value P of the cycle counter is identical to the block number Q; if yes, go to Step 121-4; otherwise, go to Step 121-3.

Step 121-3, encrypt the command data of the Pth block with the first 8 bytes of the second session key and signature information value of the card, replace the original signature information value of the card with the obtained signature result of 8 bytes and store the same, add 1 to P, and then go to Step 121-2.

Step 121-4, encrypt the command data of the Pth block, i.e. the last block, with the second session key and the signature information value of the card to obtain a signature result of 8 bytes and store the signature result as the card signature.

In the embodiment 1, the initial value of the P is 1 and the initial value of the signature information value of the card is 00 of 8 bytes.

Step 122, the card compares the outside-card entity signature with the card signature, if they are identical, go to Step 123; otherwise, go to Step 120.

Step 123, the card modifies a preset part of the authentication data, adds 1 to the serial counting value, stores the card signature as signature information value of the card, and stores the current safety level.

Specifically, the step includes modifying the first byte of the authentication data as 80, deducting 8 from the length value of the data field and storing the third byte of the authentication data as the current safety level. In the embodiment 1, the current safety level is 0.

Figure 12:
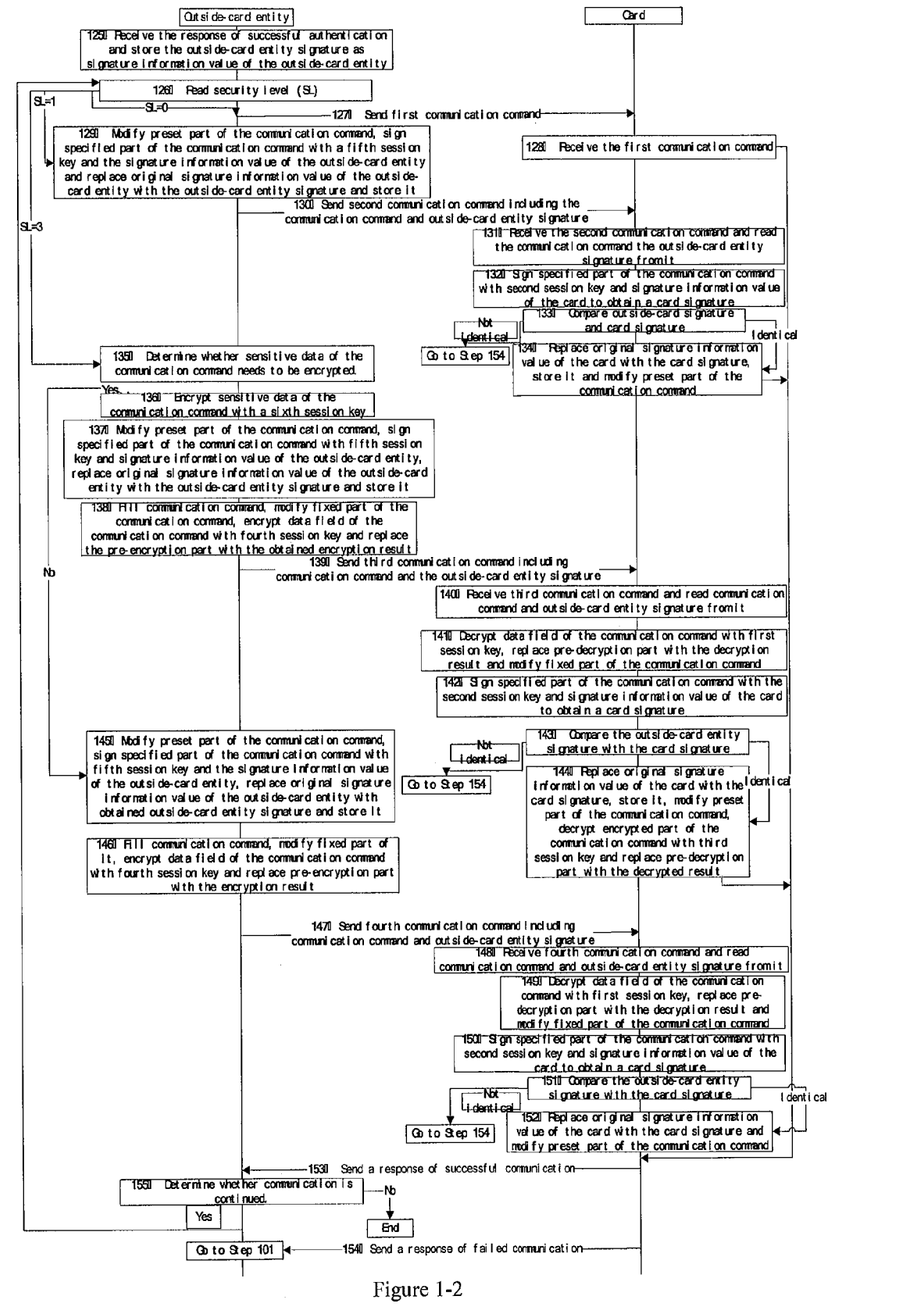

Step 124, the card sends an authentication success response to the outside-card entity;

Then goes to Step 125 as illustrated in FIG. 1-2.

Step 125, the outside-card entity receives the authentication success response and stores the signature of the outside-card entity as a signature information value of the outside-card entity.

Step 126, the outside-card entity reads the current safety level.

In the embodiment 1, if the current safety level is 0, go to Step 127;

if the current safety level is 1, go to Step 129;

if the current safety level is 3, go to Step 135.

Step 127, the outside-card entity sends the first communication command to the card.

Specifically, the outside-card entity takes the communication command as the first communication command and sends it to the card.

Step 128, the card receives the first communication command and then goes to Step 153.

In the embodiment 1, the card receives the first communication command and forwards it to an application inside of the card.

Step 129, the outside-card entity modifies a preset part of the communication command, signs a specified part of the communication command with the fifth session key and signature information value of the outside-card entity, replaces the original signature information value of the outside-card entity with the obtained signature information value of the outside-card entity, and stores the obtained signature information value of the outside-card entity.

Specifically, the step includes modifying the first byte of the communication command as 84 and adding 8 to the length value of the data field. The signing the communication command except for the length of the data field in the optional response command with the fifth session key and the signature information value of the outside-card entity includes below steps.

Step 129-1, divide the remainder of the authentication data other than the optional response command data field length into blocks in term of times of 8 bytes, for example, in term of 8 bytes, and then a block less than 8 bytes is filled to 8 bytes with algorithm and n blocks are obtained.

Step 129-2, determine whether counting value m of the cycle counter is identical to the block number n, if yes, go to Step 129-4; otherwise, go to Step 129-3.

Step 129-3, encrypt command data of the mth block with the first 8 bytes of the fifth session key and the signature information value of the outside-card entity, replace the original signature information value of the outside-card entity with the obtained encryption result, store the obtained encryption result, add 1 to m and go to Step 129-2.

Step 129-4, encrypt the command data of the mth block, i.e. the last block, with the fifth session key and the signature information value of the outside-card entity so as to obtain an encryption result of 8 bytes and stores the encryption result as an outside-card entity signature.

Specifically, the initial value of the counting value m is 1.

Step 130, the outside-card entity sends a second communication command including the communication command and the outside-card entity signature to the card.

Step 131, the card receives the second communication command and reads the communication command and the outside-card entity signature from it.

Step 132, the card signs a specified part of the communication command with the second session key and the signature information value of the card so as to obtain a card signature.

In the embodiment 1, the signing the communication command except for the length of the data field in the optional response command with the second session key and the signature information value of the card includes below steps.

Step 132-1, divide the remainder of the authentication data other than the optional response command data field length into blocks in term of times of 8 bytes, for example, in term of 8 bytes, and a block less than 8 bytes is filled to 8 bytes with algorithm and q blocks are obtained.

Step 132-2, determine whether counting value p of the cycle counter is identical to the block number q, if yes, go to Step 132-4; otherwise, go to Step 132-3.

Step 132-3, encrypt command data of the pth block with first 8 bytes of the second session key and the signature information value of the card, replace the original signature information value of the card with the obtained encryption result, store the obtained encryption result, add 1 to p, and then go to Step 132-2.

Step 132-4, encrypt the command data of the pth block, i.e. the last block, with the second session key and the signature information value of the card so as to obtain an encryption result of 8 bytes and store the same as the card signature.

In the embodiment 1, the initial value of the counting value p is 1.

Step 133, the card compares the outside-card entity signature with the card signature, if they are identical, goes to Step 134; if they are not identical, goes to Step 154.

Step 134, the card replaces the original signature information value of the card with the card signature and stores the card signature, modifies a preset part of the communication command and goes to Step 153.

Specifically, the modifying includes modifying the first byte of the communication command as "80", and deducting 8 from length value of the data field.

Step 135, the outside-card entity determines whether the sensitive data of the communication command needs to be encrypted, if yes, goes to Step 136; otherwise, goes to Step 145.

Step 136, the outside-card entity encrypts the sensitive data of the communication command with the sixth session key.

In the embodiment 1, the outside-card entity encrypts the sensitive data of the communication command with the sixth session key with DES_CBC or by other algorithm. Before the encryption, the length of the sensitive data needs to be filled to times of 8 bytes with a method agreed by the outside-card entity with the card, and details of it are eliminated herein.

Step 137, the outside-card entity modifies a preset part of the communication command, signs a specified part of the communication command with the fifth session key and the signature information value of the outside-card entity, replaces the original signature information value of the card with the obtained outside-card entity signature, and stores the obtained outside-card entity signature.

Specifically, the modifying includes modifying the first byte of the communication command as "84" and adding 8 to length value of the data field. The signing the communication command except for the length of the data field in the optional response command with the fifth session key, and the signature information value of the outside-card entity is same as that used in Step 129.

Step 138, the outside-card entity appends the communication command, modifies the fixed part of the communication command, encrypts the data field of the communication command with the fourth session key, and replaces the pre-encryption part with the obtained encryption result.

In the embodiment 1, the fixed part of the communication command is a length value of the data field, and the data field of the communication command includes the length value of the data field of the communication command. That is, Step A, determine whether the length value of the data field of the communication command is times of 8 bytes, if yes, go to Step B; otherwise, go to Step C.

Step B, length of the filled data is 0 and go to Step D.

Step C, append the data field with a specified method to times of 8 bytes.

Step D, take the length value of the data field plus length of the filled data as a new length value of the data field.

Step E, encrypt the data field of the communication command with the fourth session key.

In the embodiment 1, encrypt the data field of the communication command with the fourth session key with DES-CBC algorithm or 3DES-CBC algorithm or other algorithm.

Step 139, the outside-card entity sends a third communication command including the communication command and the outside-card entity signature to the card.

Step 140, the card receives the third communication command and reads the communication command and the outside-card entity signature from it.

Step 141, the card decrypts the data field of the communication command with the first session key, replaces the pre-encryption part with the obtained encryption result, and modifies a fixed part of the communication command.

In the embodiment 1, the card decrypts the data field of the communication command with the first session key with DES-CBC algorithm and takes the length value of the data field of the communication command minus the filled data length as a new length value of the data field.

Step 142, the card signs a specified part of the communication command with the second session key and the signature information value of the card to obtain a card signature.

In the embodiment 1, signing the communication command except for the length of the data field of the optional response command with the second session key and the signature information value of the card uses the same method as Step 132.

Step 143, the card compares the outside-card entity signature with the card signature, if they are identical, goes to Step 144; otherwise, goes to Step 154.

Step 144, the card replaces the original signature information value of the card with the card signature and stores the card signature, decrypts the encrypted part of the communication command with the third session key, replaces the pre-decryption part with the decrypted result and then goes to Step 153.

In the embodiment 1, the modifying preset part of the communication command includes modifying the first byte of the communication command as "80" and deducting 8 from the length value of the data field. The third session key decrypts the encrypted part of the communication command with DES_CBC algorithm to obtain the sensitive data.

Step 145, the outside-card entity modifies a preset part of the communication command, signs a specified part of the communication command with the fifth session key and the signature information value of the outside-card entity to obtain an outside-card entity signature, replaces the original signature information value of the outside-card entity with the outside-card entity signature and stores the outside-card entity signature.

In the embodiment 1, stores the outside-card entity signature with the same step as that used in Step 129.

Step 146, the outside-card entity fills the communication command, modifies a fixed part of the communication command, encrypts the data field of the communication command with the fourth session key and replaces the pre-encryption part with the obtained encryption result.

In the embodiment 1, the fixed part of the communication command is the length value of the data field and the data field of the communication command includes length value of the data field of the communication command. Details of the step are the same as Step 138.

Step 147, the outside-card entity sends the fourth communication command including the communication command and the outside-card entity signature to the card.

Step 148, the card receives the fourth communication command and reads the communication command and the outside-card entity signature from it.

Step 149, the card decrypts the data field of the communication command with the first session key, replaces the pre-decryption part with the obtained decryption result and modifies the fixed part of the communication command.

In the embodiment 1, modifies the fixed part of the communication command with same step as Step 141.

Step 150, the card signs a specified part of the communication command with the second session key and the signature information value of the card to obtain a card signature.

In the embodiment 1, signing the communication command except for the length of the data field of the optional response command with the second session key and the signature information value of the card uses the same step as Step 132.

Step 151, the card compares the outside-card signature with the card signature, if they are identical, goes to Step 152; otherwise, goes to Step 154.

Step 152, the card replaces the original signature information value of the card with the card signature, stores the card signature and modifies a preset part of the communication command.

In the embodiment 1, the modifying a preset part of the communication command includes modifying first byte of the communication command as "80" and deducting 8 from length value of the data field.

Step 153, the card sends a communication success response to the outside-card entity and then goes to Step 155.

Step 154, the card sends a communication failure response to the outside-card entity and then goes to Step 101.

Step 155, the outside-card entity determines whether the communication is finished, if yes, ends; otherwise, returns to Step 126.

The above-mentioned are only part embodiments of the invention, not a limit to scope of protection of the invention, and any change and substitution made by those skilled in the art within the technology scope disclosed by the invention should fall within the scope of protection of the invention. Therefore, the scope of protection of the invention should be based on the appended claims.

The invention claimed is:

1. A safe communication method of a card, characterized in that, said method comprises:

Step S1, generating a first data block, signing the first data block to obtain a first signature result, and sending an authentication command to an outside-card entity by the card;

Step S2, receiving the authentication command and obtaining the first signature result from the authentication command by the outside-card entity, generating a second data block and signing the second data block to obtain a second signature result by the outside-card entity, and comparing the first signature result with the second signature result, if they are identical, going to Step S3; and if they are not identical, returning to Step S1;

Step S3, generating a third data block and signing the third data block to obtain a third signature result by the outside-card entity, taking the obtained third signature result as a part of the authentication data, storing a current safety level, signing the authentication data to obtain an outside-card entity signature and sending an external authentication command to the card;

Step S4, receiving the external authentication command, obtaining the authentication data and the outside-card entity signature from the external authentication command, and obtaining the third signature result from the authentication data by the card; generating a fourth data block and signing the fourth data block to obtain a fourth signature result by the card, and comparing the third signature result with the fourth signature result, if they are not identical, returning to Step S1; and if they are identical, going to Step S5;

Step S5, signing the obtained authentication data to obtain a card signature by the card, comparing the outside-card entity signature with the card signature, if they are not identical, returning to Step S1; and if they are identical, going to Step S6;

Step S6, storing the current safety level and sending an authentication success response to the outside-card entity by the card;

Step S7, reading the current safety level and performing operation according to the safety level, and sending a communication command according to the safety level to the card by the outside-card entity;

Step S8, performing operation according to the received communication command and sending a communication success response to the outside-card entity by the card; and Step S9, receiving the communication success response and determining whether the communication is continued by the outside-card entity, if yes, going to Step S7; otherwise, ending.

2. The safe communication method of a card of claim 1, wherein before Step S1, the method comprises:
generating a first random number and storing the first random number by the outside-card entity;
sending an internal initialization command including the first random number to the card by the outside-card entity;
receiving the internal initialization command and reading the first random number from the internal initialization command by the card;
generating a second random number and storing the second random number by the card; and
generating a first session key, a second session key and a third session key and storing the first session key, the second session key and the third session key by the card.

3. The safe communication method of a card of claim 2, wherein
the first random number generated by the outside-card entity comprises 8 bytes, while the second random number generated by the card comprises 6 bytes;
generating the first session key by the card comprises generating a first derivative data with a serial counting value, a first constant and a first fixed data by the card, and encrypting the first derivative data with a built-in first key and with a first preset method to obtain the first session key;
generating the second session key by the card comprises generating a second derivative data with the serial counting value, a second constant and the first fixed data by the card, and encrypting the second derivative data with a built-in second key and with the first preset method to obtain the second session key; and
generating the third session key by the card comprises generating a third derivative data with the serial counting value, a third constant and the first fixed data by the card, and encrypting the third derivative data with a built-in third key and with the first preset method to obtain the third session key.

4. The safe communication method of a card of claim 2, wherein Step S1 comprises concatenating, by the card, the first random number, the serial counting value and the second random number to obtain the first data block, signing the first data block with the first session key and a first variable to obtain the first signature result, and sending the authentication command including the first signature result, the second random number and the serial counting value to the outside-card entity.

5. The safe communication method of a card of claim 1, wherein between Step S1 and Step S2, the method further comprises
obtaining, by the outside-card entity, the second random number and the serial counting value from the authentication command;
generating, by the outside-card entity, a fourth session key comprises generating the fourth derivative data with the serial counting value, the first constant and the first fixed data and encrypting the fourth derivative data with the built-in first key and with the first preset method to obtain the fourth session key by the outside-card entity;
generating, by the outside-card entity, a fifth session key comprises generating the fifth derivative data with the serial counting value, the second constant and the first fixed data and encrypting the fifth derivative data with the built-in second key and with the first preset method to obtain the fifth session key by the outside-card entity; and
generating, by the outside-card entity, a sixth session key comprises generating the sixth derivative data with the serial counting value, a third constant and the first fixed data and encrypting the sixth derivative data with a built-in third key and with the first preset method to obtain the sixth session key by the outside-card entity.

6. The safe communication method of a card of claim 5, wherein in Step S2, the generating the second data block and signing the second data block to obtain the second signature result by the outside-card entity comprises concatenating, by the outside-card entity, the first random number, the serial counting value and the second random number to obtain the second data block, and signing the second data block with the fourth session key and a second variable to obtain the second signature result; and
in Step S3, generating a third data block and signing the third data block, by the outside-card entity comprises concatenating, by the outside-card entity, the serial counting value, the second random number and the first random number to obtain the third data block, and signing the third data block with the fourth session key and a third variable to obtain the third signature result.

7. The safe communication method of a card of claim 2, wherein generating a fourth data block and signing the fourth data block by the card
comprises concatenating, by the card, the serial counting value, the second random number and the first random number to obtain the fourth data block, and signing the fourth data block with the first session key and a fourth variable to obtain the fourth signature result.

8. The safe communication method of a card of claim 4, wherein the signature method comprises
Step A, dividing the data block to be signed into blocks in term of a preset byte number, and for a data block less than the preset byte number, appending the data block to the preset byte number;
Step B, determining whether a counting value of a cycle counter is identical to the number of blocks, if yes, going to Step D; otherwise, going to Step C;
Step C, encrypting the command data being divided into the number of blocks equaling to the current counting value with a specified byte of the session key and a variable with a second preset method, replacing the variable with the obtained encryption result, and adding 1 to the current counting value and then going to Step B; and Step D, encrypting command data of a last block with the session key and the variable with the second preset method and storing the obtained encryption result as a signature result.

9. The safe communication method of a card of claim 6, wherein the signature method comprises
   Step A, dividing the data block to be signed into blocks in term of a preset byte number, and for a data block less than the preset byte number, appending the data block to the preset byte number;
   Step B, determining whether a counting value of a cycle counter is identical to the number of blocks, if yes, going to Step D; otherwise, going to Step C;
   Step C, encrypting the command data being divided into the number of blocks equaling to the current counting value with a specified byte of the session key and a variable with a second preset method, replacing the variable with the obtained encryption result, and adding 1 to the current counting value and then going to Step B; and
   Step D, encrypting command data of a last block with the session key and the variable with the second preset method and storing the obtained encryption result as a signature result.

10. The safe communication method of a card of claim 7, wherein the signature method comprises
    Step A, dividing the data block to be signed into blocks in term of a preset byte number, and for a data block less than the preset byte number, appending the data block to the preset byte number;
    Step B, determining whether a counting value of a cycle counter is identical to the number of blocks, if yes, going to Step D; otherwise, going to Step C;
    Step C, encrypting the command data being divided into the number of blocks equaling to the current counting value with a specified byte of the session key and a variable with a second preset method, replacing the variable with the obtained encryption result, and adding 1 to the current counting value and then going to Step B; and
    Step D, encrypting the command data of the last block with the session key and the variable with the second preset method, and storing the obtained encryption result as a signature result.

11. The safe communication method of a card of claim 1, wherein, before storing, by the outside-card entity, the current safety level, Step S3 further comprises: modifying, by the outside-card entity, a preset part of the authentication data; and before storing, by the card, the current safety level, Step S6 further comprises: modifying, by the card, a preset part of the authentication data, adding 1 to the serial counting value, and storing a card signature as a card signature information value; and
    storing, by the outside-card entity and the card, the current safety level comprises storing the third byte of the authentication data as the current safety level.

12. The safe communication method of a card of claim 11, wherein modifying, by the outside-card entity, a preset part of the authentication data comprises modifying the first byte of the authentication data as the first fixed value, and adding 8 to the length value of the data field; and
    modifying, by the card, a preset part of the authentication data comprises modifying the first byte of the authentication data as the second fixed value, and deducting 8 from the length value of the data field.

13. The safe communication method of a card of claim 2, wherein signing, by the outside-card entity, the authentication data comprises signing, by the outside-card entity, a specified part of the authentication data with a fifth session key and an outside-card signature information value to obtain an outside-card entity signature; and
    signing, by the card, the authentication data comprises signing, by the card, a specified part of the authentication data with the second session key and the card signature information value to obtain a card signature.

14. The safe communication method of a card of claim 5, wherein signing, by the outside-card entity, the authentication data comprises signing, by the outside-card entity, a specified part of the authentication data with a fifth session key and an outside-card signature information value to obtain an outside-card entity signature; and
    signing, by the card, the authentication data comprises signing, by the card, a specified part of the authentication data with the second session key and the card signature information value to obtain a card signature.

15. The safe communication method of a card of claim 13, wherein
    the specified part of the authentication data comprises a remainder of the authentication data other than an optional response command data field length;
    signing, by the outside-card entity, a specified part of the authentication data comprises:
    Step A, dividing the remainder of the authentication data other than the optional response command data field length into blocks in term of 8 bytes, and for the block less than 8 bytes, it being filled automatically to 8 bytes so as to obtain N blocks;
    Step B, determining whether a counting value M of the cycle counter is identical to a block number N; if yes, going to Step D; otherwise, going to Step C;
    Step C, encrypting the command data of the Mth block with the first 8 bytes of the fifth session key and the outside-card signature information value, replacing an original outside-card signature information value with the obtained encryption result and storing the obtained encryption result, adding 1 to the counting value M and then going to Step B;
    Step D, encrypting the command data of the last block with the fifth session key and the outside-card entity signature information value to obtain an encryption result of 8 bytes, and storing the encryption result as an outside-card entity signature; and
    signing, by the card, a specified part of the authentication data comprises that
    Step a, dividing a remainder of the authentication data other than an optional response command data field length into blocks in term of 8 bytes, and for the block less than 8 bytes, it being filled automatically to 8 bytes and Q blocks being obtained;
    Step b, determining whether counting value P of the cycle counter is identical to the block number Q; if yes, going to Step d; otherwise, going to Step c;
    Step c, encrypting the command data of the Pth block with the first 8 bytes of the second session key and the card signature information value, replacing an original card signature information value with the obtained encryption result, storing the obtained encryption result, adding 1 to the counting value P and then going to Step b; and
    Step d, encrypting the command data of the last block with the second session key and the card signature information value to obtain an encryption result of 8 bytes, and storing the encryption result as a card signature.

16. The safe communication method of a card of claim 15, wherein
before Step C, the method further comprises determining an outside-card entity signature information value,
when the outside-card entity signature is computed for the first time, an initial value of the outside-card entity signature value is a second fixed data with 8 bytes, while when the outside-card entity signature is not computed for the first time, the outside-card entity signature value is obtained by computing the outside-card entity signature being authenticated correct last time with the first 8 bytes of the fifth session key and with the third preset method; and
before Step c, the method further comprises determining the card signature information value,
when the card signature is computed for the first time, the initial value of the card signature value is a second fixed data with 8 bytes, while when the card signature is not computed for the first time, the card signature value is obtained by computing the card signature being authenticated correct last time with first 8 bytes of the second session key and with the third preset method.

17. The safe communication method of a card of claim 1, wherein Step 7 comprises
reading, by the outside-card entity, the current safety level, and if the current safety level is 0, sending, by the outside-card entity, the first communication command to the card.

18. The safe communication method of a card of claim 1, wherein Step 7 comprises
reading, by the outside-card entity, the current safety level, and if the current safety level is 1, modifying, by the outside-card entity, a preset part of the communication command, signing a specified part of the communication command with the fifth session key and the outside-card entity signature information value, replacing an original outside-card signature information value with the obtained outside-card entity signature, storing the obtained outside-card entity signature, and sending a second communication command including the communication command and the outside-card entity signature to the card.

19. The safe communication method of a card of claim 1, wherein Step S7 comprises that
reading, by the outside-card entity, the current safety level, and if the current safety level is 3, determining, by the outside-card entity, whether sensitive data of the communication command needs to be encrypted;
if yes, encrypting, by the outside-card entity, the sensitive data of the communication data with the sixth session key, modifying a preset part of the communication command by the outside-card entity, signing a specified part of the communication command with the fifth session key and the outside-card entity signature information value, replacing an original outside-card entity signature information value with the outside-card entity signature and storing the outside-card entity signature; filling the communication command, modifying a fixed part of the communication command, encrypting a data field of the communication command with the fourth session key, and replacing pre-encryption part with the obtained encryption result by the outside-card entity; sending, by the outside-card entity, a third communication command including the communication command and the outside-card entity signature to the card;
if not, modifying a preset part of the communication command, signing a specified part of the communication command with the fifth session key and the outside-card entity signature information value, replacing an original outside-card entity signature information value with the obtained outside-card entity signature by the outside-card entity; filling the communication command, modifying a fixed part of the communication command, encrypting data field of the communication command with the fourth session key, and replacing the pre-encryption part with the obtained encryption result by the outside-card entity; sending, by the outside-card entity, a fourth communication command including the communication command and the outside-card entity signature to the card.

20. The safe communication method of a card of claim 18, wherein
encrypting, by the outside-card entity, sensitive data of the communication command with the sixth session key comprises encrypting, by the sixth session key, the sensitive data of the communication command with the first preset method, and before the encryption, the method comprises filling the length of the sensitive data to times of 8 bytes with a filling method agreed by the outside-card entity and the card; and
filling the communication command and modifying a fixed part of the communication command by the outside-card entity comprises:
Step E, determining whether the length value of the data field of the communication command is times of 8 bytes; if yes, going to Step F; otherwise, going to Step G;
Step F, the length of the filled data being 0 and going to Step H;
Step G, filling the data field to times of 8 bytes with a specified method;
Step H, taking the length value of the data field of the communication command plus the filled data length as a new length value of the data field; and
encrypting the data field of the communication command with the fourth session key comprises encrypting the data field of the communication command with the fourth session key with the first preset method.

21. The safe communication method of a card of claim 17, wherein modifying, by the outside-card entity, a preset part of the communication command comprises modifying a first byte of the communication command as a first fixed value, and adding 8 to the length value of the data field; and
signing a specified part of the communication command with the fifth session key and the outside-card entity signature information value comprises:
Step A', dividing remainder of the communication command other than an optional response command data field length into blocks in terms of 8 bytes, and for a block less than 8 bytes, it being filled to 8 bytes automatically and N' blocks being obtained;
Step B', determining whether a counting value M' of the cycle counter is identical to a block number N'; if yes, going to Step D'; and if not, going to Step C';
Step C', encrypting the command data of M'th block with the first 8 bytes of the fifth session key and the outside-card entity signature information value, replacing the original outside-card entity information value with the obtained encryption result, storing the obtained encryption result, adding 1 to the counting value M' and then going to Step B'; and
Step D': encrypting the command data of the last block with the fifth session key and the outside-card entity signature information value, and storing the obtained encryption result as an outside-card entity signature.

22. The safe communication method of a card of claim 18, wherein
modifying, by the outside-card entity, a preset part of the communication command comprises modifying the first byte of the communication command as a first fixed value, and adding 8 to length value of the data field; and
signing a specified part of the communication command with the fifth session key and the outside-card entity signature information value comprises:
Step A', dividing remainder of the communication command other than an optional response command data field length into blocks in terms of 8 bytes, and for a block less than 8 bytes, it being filled to 8 bytes automatically and N' blocks being obtained;
Step B', determining whether a counting value M' of the cycle counter is identical to a block number N'; if yes, going to Step D'; and if not, going to Step C';
Step C', encrypting the command data of M'th block with the first 8 bytes of the fifth session key and the outside-card entity signature information value, replacing the original outside-card entity information value with the obtained encryption result, storing the obtained encryption result, adding 1 to the counting value M' and then going to Step B'; and
Step D': encrypting the command data of the last block with the fifth session key and the outside-card entity signature information value, and storing the obtained encryption result as an outside-card entity signature.

23. The safe communication method of a card of claim 1, wherein Step S8 comprises:
if the current safety level is 0, receiving, by the card, the first communication command and forwarding it to an application inside of the card, and sending a communication success response to the outside-card entity.

24. The safe communication method of a card of claim 1, wherein Step S8 comprises:
if the current safety level is 1, receiving, by the card, the second communication command and reading the communication command and the outside-card entity signature from the second communication command;
signing, by the card, a specified part of the communication command with the second session key and the card signature information value to obtain the card signature;
comparing, by the card, the outside-card entity signature with the card signature,
if they are identical, replacing, by the card, an original card signature information value with the card signature and storing the card signature, modifying a preset part of the communication command, and sending a communication success response to the outside-card entity;
if they are not identical, sending, by the card, a communication failure response to the outside-card entity.

25. The safe communication method of a card of claim 1, wherein Step S8 comprises:
if the current safety level is 3, receiving, by the card, the third communication command, and reading the communication command and the outside-card entity signature from the third communication command;
decrypting, by the card, data field of the communication command with the first session key, replacing a pre-encryption part with the obtained encryption result, and modifying a fixed part of the communication command;
signing, by the card, a specified part of the communication command with the second session key and the card signature information value to obtain the card signature;
comparing, by the card, the outside-card entity signature with the card signature,
if they are identical, replacing, by the card, an original card signature information value with the card signature, storing the obtained card signature, and modifying a preset part of the communication command; if cipher text is included in the communication command, decrypting, by the card, the cipher text in the communication command with the third session key, replacing a pre-decryption part with the decrypted result, and sending a communication success response to the outside-card entity; if cipher text is not included in the communication command, sending the communication success response to the outside-card entity;
if they are not identical, sending, by the card, a communication failure response to the outside-card entity.

26. The safe communication method of a card of claim 25, wherein
decrypting, by the card, the data field of the communication command with the first session key comprises decrypting data field of the communication command with the first session key and with a first preset method;
the modifying the fixed part of the communication command comprises taking the length value of the communication command minus the filled data length as a new length value of the data field; and
decrypting, by the third session key, the cipher text of the communication command comprises decrypting the cipher text of the communication command with the third session key and with first preset method.

27. The safe communication method of a card of claim 24, wherein
signing, by the card, a specified part of the communication command with the second session key and the card signature information value comprises:
Step a': dividing a remainder of the authentication data other than an optional response command data field length into blocks in term of 8 bytes, and then for a block less than 8 bytes, it being filled automatically to 8 bytes and q' blocks being obtained;
Step b', determining whether counting value p' of the cycle counter is identical to block number q'; if they are identical, going to Step d'; otherwise, going to Step c';
Step c', encrypting the command data of the pth block with the first 8 bytes of the second session key and the card signature information value, replacing the original card signature information value with the obtained encryption result, and storing the obtained encryption result, adding 1 to the counting value p' and then going to Step b';
Step d', encrypting the command data of the last block with the second session key and the card signature information value, and storing the obtained encryption result as the card signature; and
modifying the preset part of the communication command comprises modifying the first byte of the communication command as a second fixed value, and deducting 8 from the length value of the data field.

28. The safe communication method of a card of claim 25, wherein
signing, by the card, a specified part of the communication command with the second session key and the card signature information value comprises:
Step a': dividing a remainder of the authentication data other than an optional response command data field length into blocks in term of 8 bytes, and then for a block less than 8 bytes, it being filled automatically to 8 bytes and q' blocks being obtained;

Step b', determining whether counting value p' of the cycle counter is identical to block number q'; if they are identical, going to Step d'; otherwise, going to Step c';

Step c', encrypting the command data of the pth block with the first 8 bytes of the second session key and the card signature information value, replacing the original card signature information value with the obtained encryption result, and storing the obtained encryption result, adding 1 to the counting value p' and going to Step b';

Step d', encrypting the command data of the last block with the second session key and the card signature information value, and storing the obtained encryption result as the card signature; and modifying the preset part of the communication command comprises modifying the first byte of the communication command as a second fixed value, and deducting 8 from length value of the data field.

* * * * *